Patented Feb. 13, 1940

2,189,830

UNITED STATES PATENT OFFICE 2,189,830

PROCESS FOR PRODUCTION OF ASCORBIC ACID

Otto Zima, Darmstadt, Germany, assignor to Merck & Co. Inc., Rahway, N. J., a corporation of New Jersey No Drawing. Application November 19, 1936, Serial No. 111,711. In Germany November 25, 1935

7 Claims. (Cl. 260—344)

This invention relates to a process for producing ascorbic acid (vitamin C) by direct steps from the intermediate, diacetone-2-keto-1-gulonic acid.

Up to now, the best technical process for the synthetic production of vitamin C involved the use of diacetone-sorbose as the starting material. This is first oxidized to diacetone-2-keto-1-gulonic acid, which is converted into 2-keto-1-gulonic acid by heating with water. This acid is then converted to its methyl ester, the latter being in turn converted into ascorbic acid.

Another process to shorten this lengthy reaction has recently been described.

In their first detailed publication regarding the synthesis of vitamin C, [Helv. Chim. Acta. 17, 311 (1934)] Reichstein and Grussner state that ascorbic acid can be prepared directly from diacetone-2-keto-1-gulonic acid by heating this last-named acid with water or dilute acids. However, such poor yields are obtained by this process that it has not found application in actual commercial practice. The cited authors explain that the poor yields obtained are due to the fact that "the conditions for the formations" of ascorbic acid in this reaction, "in comparison with the stability of ascorbic acid, are rather energetic", because they have found that by heating ascorbic acid with dilute hydrochloric acid (0.2 n-HCl was used in the experiment) "far-reaching changes set in under yellow discoloration, formation of furfurol, and separation of humin-like substances."

It was surprising, therefore, to find that by working with concentrated acid instead of dilute acid the described process of converting diacetone-2-keto-1-gulonic acid into ascorbic acid can be modified to a practical production-method which surpasses in yield and simplicity all heretofore known processes for the synthetic production of this vitamin. By this process, there is first obtained a deep black solution, similar to that mentioned above in connection with the Reichstein and Grussner report. In spite of the forbidding appearance of this solution, however, pure ascorbic acid can be obtained from it, by my improved process, in satisfactory yield. It is apparent, therefore, that the process of working with concentrated instead of a dilute acid, and under the appropriate conditions as disclosed herein, affects the reaction quite differently in the ultimate result and yield.

In carrying out the process in accordance with my invention, the following facts have been developed:

1. The yield of ascorbic acid increases with the concentration of the hydrochloric acid employed, if the other conditions, such as the quantity of acid used, the temperature, and the time of reaction are adjusted to their most favorable values. Thus, it is advantageous to replace the hydrochloric acid lost during heating by constantly conducing HCl gas into the reaction solution, or by working in a closed vessel, i. e., under pressure.

2. When the temperature is varied within practically applicable limits, no material changes in the yields obtained are noted, but the time required for the yield to reach its optimum point will vary considerably.

3. In intermittently checking up on the course of the reaction process, by taking samples and titrating them for ascorbic acid, it is noted that, within the given conditions, the titratable ascorbic acid increases to a certain maximum yield, and then again decreases more slowly. For example, when using HCl of specific weight 1.19 at room temperature, the most favorable point of the thus determined chart of the course of the reaction is reached after a few days, whereas at 60° the optimum point of the reaction is reached after a few hours, and at 100° even after a few minutes. For technical purposes, temperatures below room temperature will be found to require too much time, whereas at temperatures above 100° the work would have to be done so quickly that it would require special apparatus and especially careful control. The most satisfactory time of reaction, for practical purposes, has been found to lie between ½ to 1½ hours, and these lie at reaction temperatures between 60 and 80° C., which are, therefore, preferable.

4. The effective quantity of concentrated hydrochloric acid employed can be varied within reasonably wide limits. Thus only slight differences in the reaction velocity and in the yield are observed whether one part of the starting material is heated with one part of HCl or even with ten parts of the acid. However, if the HCl is diluted, then the yield of ascorbic acid will quickly decrease. In a comparative test, in which one part of substance was heated with 10 parts of concentrated HCl (1.19) to 80° C., and the optimum point of reaction was determined by titration of samples, a yield of 80% of theory of ascorbic acid was obtained. By diluting the acid with water in the proportions 1:1, 1:2, and 1:5, the maximum values of the ascorbic acid produced were, respectively, 65, 56, and 48% of theory.

From the foregoing, it is evident that for every initial batch of material, the most favorable duration of the reaction must first be determined by titration of samples currently taken out. Under exactly the same conditions, the reaction of other batches can then be discontinued at the most favorable time thus determined.

The finishing up of the reaction solution to pure ascorbic acid may be accomplished by methods conventionally employed for the special objects to be attained. For example, the dark-colored reaction solution may be cleared by thoroughly shaking it with or by filtration through animal charcoal, and the hydrochloric acid may then be evaporated and the residue recrystallized from water.

Because of the sensitivity of ascorbic acid to HCl, the evaporation of the acid should preferably be carried out at low temperature, under vacuum. Of course, the HCl can also be neutralized, but this involves the inconvenience of having to separate the ascorbic acid from salts.

Examples

1. About 1 part of diacetone-keto-gulonic acid is heated with about 3 parts of HCl (1.19) to about 60° C. The reaction process is followed by titration with n/10 iodine solution. When the optimum reaction point is reached (after about one hour), the resulting dark black-colored solution is poured on 3 parts of ice. The solution is shaken briefly with animal charcoal, filtered, and evaporated in vacuo to crystallization. The crystallized residue is washed with alcohol. Water is thereupon added to the wash-alcohol and the water-alcohol solution is coincentrated in vacuo to remove the alcohol. The residue is then combined with the mother-liquor of the first crystallization, diluted with water, and once more treated with animal charcoal. By concentration in vacuo, a second crystallization is obtained which is treated in the same manner. A third crystallization can be obtained from the mother liquors.

Even after only one recrystallization of the impure acid a yield of pure ascorbic acid amounting to 60–75% is obtained.

2. About 1 part of diacetone-keto-gulonic acid is left standing at room temperature with 5 parts of concentrated HCl. A sample is taken out every 24 hours and titrated. The reaction optimum is reached after about 5–7 days. The process is continued in accordance with the method described in Example 1.

3. About 1 part of diacetone-keto-gulonic acid is dissolved in about 6 parts of concentrated HCl and the solution brought to the boiling point. HCl gas is continuously added. The optimum of the reaction is reached after about 8–12 minutes. The mixture is quickly cooled, diluted with double its quantity of water, filtered over animal charcoal, and the HCl evaporated in vacuo. The further steps of production and purification are the same as in Example 1.

4. Gaseous hydrogen chloride is passed into a crystalline mass of about 100 gms. of moistened diacetone-keto-gulonic acid containing about 15–20% water. Almost complete liquefaction gradually occurs. The temperature is raised to about 60° C. and more hydrogen chloride is added until the maximum ascorbic acid content, as determined by titration, is reached. It is then immediately diluted with cold water and worked up in the same manner as described in the foregoing examples. The yield obtained is about 60% of theory.

5. About 250 gms. of diacetone-keto-gulonic acid are heated with about 750 cc. of concentrated hydrochloric acid, care being taken that the acetone liberated can escape. This is accomplished, for example, by passing a gentle stream of $CO_2$ over the surface of the liquid. The formation of resinous secondary products is thus reduced. The yield obtained is about 60% of theory.

6. About 60 parts of diacetone-keto-gulonic acid are heated with about 30 parts of hydrochloric acid (1:19). After the reaction process subsides, the mixture is cooled immediately with ice and the ascorbic acid which crystallizes out is filtered off by suction. The mother liquor is worked up in accordance with the further steps of the foregoing examples. The yield obtained is 60–70% of theory.

I claim as my invention:

1. A process for the production of l-ascorbic acid which comprises treating diacetone-keto-gulonic acid with strongly concentrated hydrochloric acid.

2. A process for the production of l-ascorbic acid which comprises treating diacetone-keto-gulonic acid with hydrochloric acid of substantially specific gravity 1.19.

3. A step in the process for producing l-ascorbic acid directly from diacetone-keto-gulonic acid by treating the same with strongly concentrated hydrochloric acid at temperatures between 60 and 100° C., which comprises continuously conducting hydrochloric acid gas into the reaction liquid.

4. A process for the production of l-ascorbic acid which comprises treating diacetone-keto-gulonic acid with strongly concentrated hydrochloric acid under pressure greater than atmospheric pressure.

5. A process for the production of l-ascorbic acid which comprises heating diacetone-keto-gulonic acid with hydrochloric acid of specific weight 1.19, at a temperature between 60 and 100° C. titrating samples taken from the reaction liquid until the point of maximum yield is reached pouring the resulting black solution on ice, shaking the solution with animal charcoal, filtering, evaporating in vacuo to crystallization.

6. In a process for the production of l-ascorbic acid according to claim 4, the further steps of washing the crystallized residue with alcohol, adding water to the washing alcohol, concentrating the residue in vacuo to remove the alcohol, combining it with the mother liquor of the first crystallization, diluting with water, treating with animal charcoal, and concentrating in vacuo to crystallization.

7. A process for the production of l-ascorbic acid which comprises treating diacetone-keto-gulonic acid with strongly concentrated hydrochloric acid until titration with iodine in acid solution shows the point of maximum yield has been reached.

OTTO ZIMA.